United States Patent [19]

Watson et al.

[11] Patent Number: 5,749,611
[45] Date of Patent: May 12, 1998

[54] DOOR LATCH REMOTE CONTROL ASSEMBLY

[75] Inventors: Earl L. Watson, Walled Lake; Nicolaas C. Akemann, South Lyon, both of Mich.

[73] Assignee: Chrysler Corporation, Auburn Hills, Mich.

[21] Appl. No.: 706,386

[22] Filed: Aug. 30, 1996

[51] Int. Cl.⁶ .................................................. E05B 3/00
[52] U.S. Cl. ................................. 292/336.3; 292/DIG. 23; 292/DIG. 27
[58] Field of Search ..................... 292/336.3, DIG. 27, 292/DIG. 23

[56] References Cited

U.S. PATENT DOCUMENTS

| | | |
|---|---|---|
| 1,013,553 | 1/1912 | Johnson . |
| 1,368,141 | 2/1921 | Hagstrom . |
| 3,679,251 | 7/1972 | Brockman et al. .................. 292/216 |
| 3,697,105 | 10/1972 | Marx ....................... 292/DIG. 27 X |
| 3,919,808 | 11/1975 | Simmons . |
| 4,796,929 | 1/1989 | Gergoe .............................. 292/28 |
| 4,930,836 | 6/1990 | Grinn . |
| 5,004,277 | 4/1991 | Campbell et al. . |
| 5,033,234 | 7/1991 | Simon et al. . |
| 5,498,038 | 3/1996 | Simon et al. . |
| 5,605,363 | 2/1997 | Kapes ..................... 292/DIG. 23 X |

FOREIGN PATENT DOCUMENTS

| | | | |
|---|---|---|---|
| 190588 | 7/1990 | Japan ..................... 292/336.3 |

*Primary Examiner*—Rodney M. Lindsey
*Attorney, Agent, or Firm*—Roland A. Fuller III

[57] ABSTRACT

A rear door latch remote control assembly for a dual-door arrangement includes a back plate mounted split-pin having a pair of operating levers pivoted thereon. A release lever, pivoted on the split-pin, is formed with an arcuate guide slot receiving a link pin. A locking lever is formed with an arcuate guide slot which also receives the link pin. With the locking lever in its latch releasing position, the actuation of either rear door handle unlatches the rear door. With the locking lever in its latch locking mode, actuation of either door handle causes its associated operating lever to freewheel, thereby obviating unlatching the rear door.

19 Claims, 6 Drawing Sheets

DOOR LATCH REMOTE CONTROL ASSEMBLY

FIELD OF THE INVENTION

This invention relates to door latching mechanisms and, more particularly, to a door latch remote control assembly for a rear door of a vehicle dual-door arrangement.

BACKGROUND OF THE INVENTION

It is known to provide dual-doors for extended cab pickup trucks in which a continuous aperture, formed through the side of the vehicle body, extends between front and rear pillars. A rear door is pivotally mounted to the rear pillar and a front door is pivotally mounted to the front pillar, wherein the rear door operates to close a rear compartment of the cab, while the front door swings to an overlying position with respect to the rear door to close the drivers compartment. A dual-door latching arrangement is required to latch the rear door whereby, upon the front door being closed, it is necessary to provide an interlock, such that closing the front door disables the rear door latching arrangement, thus preventing the rear door from being unlatched until the front door is opened. One known system includes a handle extending through the shut face of the rear door, while the shut faces of the front and rear doors are juxtaposed. As a result, the rear door shut face handle abuts the front door shut face, preventing the handle from rotating out, thereby obviating the rear door from being unlatched until the front door is opened.

SUMMARY OF THE INVENTION

The present invention fulfills the above discussed need to prevent a rear door, of a vehicle dual-door arrangement, from being unlatched until the front door is opened by providing a door latch remote control assembly on the rear door, for controlling the latching and unlatching of upper and lower rear door latches. The assembly includes a back plate, adapted for mounting on the rear door, which supports first and second operating levers and a release lever, with the levers pivoted on a plate common split-pin, whereby the assembly is of simpler, less expensive, and compact construction.

It is another feature of the invention wherein the remote control assembly split-pin includes a head member, having a stem formed with a plurality of offset shoulders, and a bushing member formed with a through bore terminating in a countersunk bore, adapted to telescopically receive the stem and an offset shoulder respectively. The split-pin allows the operating and reverse levers to rotate freely, in a parallel, closely spaced manner, while the head and bushing members adjustably "bottom-out" against each other, holding the levers rigid to the plate.

It is another feature of the invention wherein the remote control assembly includes a locking lever, in the form of a linear portion terminating in a arcuate portion, wherein the linear portion is pivoted, on a back plate pivot pin, with the arcuate portion located intermediate the pair of operating levers. A spring, connected between the plate and the free end of the arcuate portion, snaps the locking lever overcenter between its latch releasing mode and its latch locking mode.

It is yet another feature of the invention wherein the locking lever is formed with a downwardly extending tongue portion, adjacent the juncture of its linear portion and its arcuate portion. The tongue portion is adapted to be actuated by a vertically disposed, latch control rod, having its upper end slidably connected to the tongue portion and its lower end connected to an interlock mechanism, mounted on the forward shut face of the rear door. Upon the front door being closed, a pintle on the front door aft shut face trips the interlock mechanism, shifting the control rod upward, thereby snapping the locking lever to its overcenter latch locking mode, disabling both the rear door handles.

It is a still further feature of the present invention to provide the release lever with a first arcuate guide slot and the locking lever with a second arcuate guide slot, with each slot receiving a link pin. With the locking lever in its latch releasing mode, the link pin is yieldably held in contact with a distal end of the release lever guide slot, while the link pin is biased into contact with a proximate end of the locking lever guide slot by the release lever biasing spring. The release lever spring also biases the link pin into seating contact with the free end of each operating lever arcuate finger. Upon either operating lever being swung in its one direction by its associated door handle, an operating lever curved finger free end swings the link pin, through a predetermined arcuate angle of about 45 degrees, into contact with the distal end of the locking lever guide slot, thereby swinging the release lever to its latch releasing position. With the locking lever snapped to its overcenter latch locking mode, the link pin is yieldably held in contact with the proximate end of the release lever guide slot, positioning the link pin clear of the path of swinging travel of both operating lever finger portion free ends. Actuation of either rear door handle in the latch locking mode results in its linked operating lever freewheeling, thereby obviating unlatching of the rear door latches.

It is still another feature of the invention to provide first and second, latch rod clips, attached to a release lever plate in substantially diametrically opposed spaced relation with the split-pin axis. The first clip is secured to a lower end of an upwardly extending upper latch rod, while the second clip is secured to an upper end of a downwardly extending lower latch rod. An upper end of the upper latch rod is attached to an upper door latch, with the lower end of the lower latch rod attached to a lower door latch. Accordingly, with the front door open and a manual override actuator snapping the locking lever overcenter to its latch releasing mode, either one of the rear door opening handles may be actuated. Such actuation rotates the release lever, in unison with the rod clips, in the one direction about the split-pin axis, causing the upper and lower latch rods to be simultaneously shifted in respective upper and lower opposite directions, thereby simultaneously unlatching the upper and lower door latches from engagement with their associated upper and lower vehicle body latch strikers.

It is yet another feature of the present invention to provide the remote control assembly with an override actuator button, positioned on the inside of the rear door, which button is adapted to snap the locking lever overcenter, from its latch locking mode to its latch releasing mode, after the front door is opened. Thus, before either door handle actuation is possible, the override actuator, connected by a linkage to a point adjacent the free end the locking lever linear portion, must be actuated. Thus, when a person desires to open the rear door after the front door has been opened, it is necessary that the person first, pull-up on the override actuator button, snapping the locking lever overcenter to its latch releasing position, and secondly, actuate one of the rear door handles to simultaneously release the rear door upper and lower latches.

These and other features and advantages of the invention will be more fully understood from the following detailed description of the invention taken together with the accompanying drawings.

DETAILED DESCRIPTION OF THE INVENTION

Figure 1:
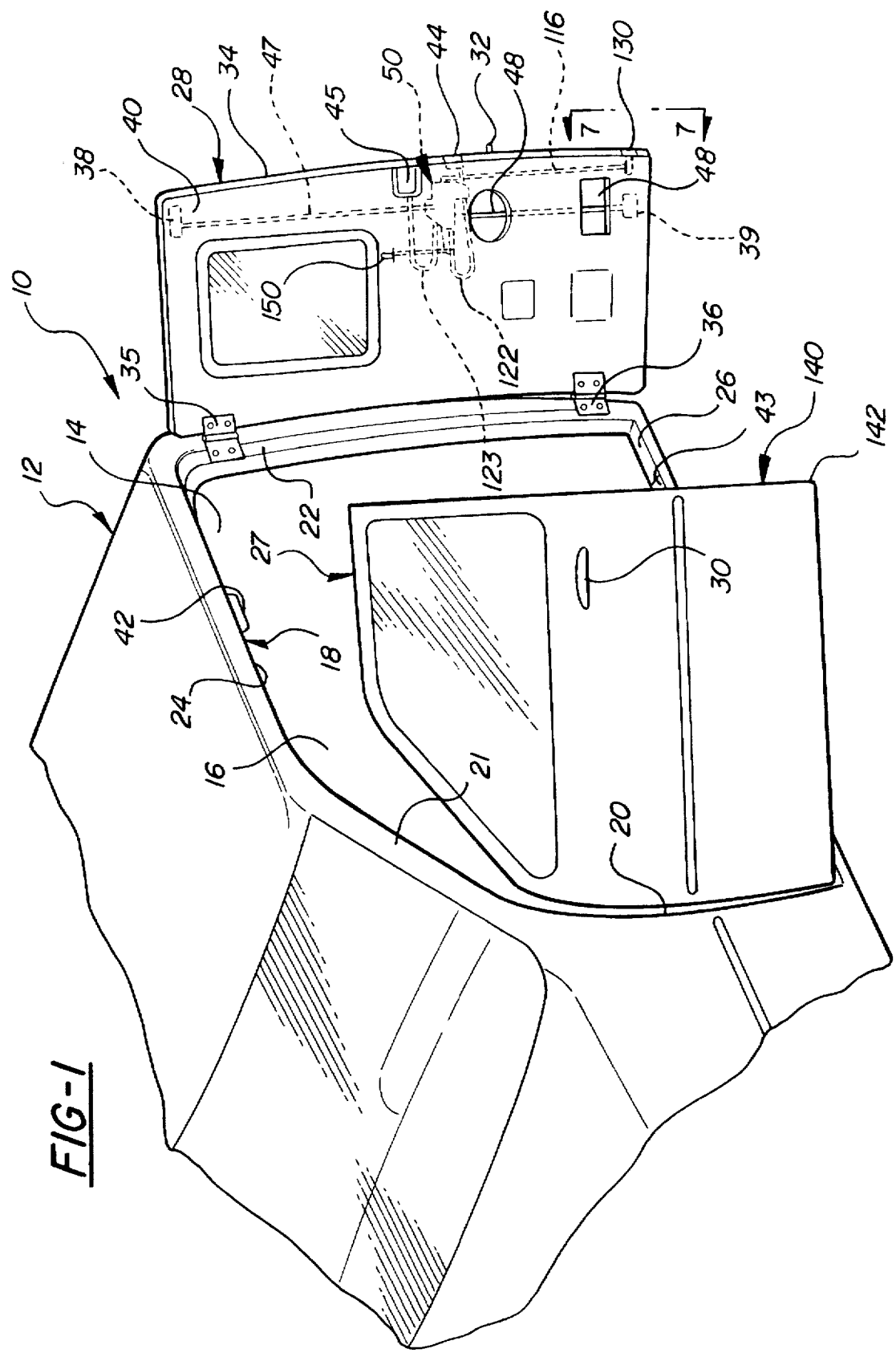
FIG. 1 is a fragmentary perspective view of a pickup truck utilizing the dual-door control assembly of the present invention.

Referring now to the drawings in detail, numeral 10 generally indicates a pickup truck having an extended cab body portion 12 and a truck bed portion, not shown. The extended cab portion 12 includes a rear compartment 14 behind forward driver and passenger compartment 16. A doorway on the left side of the cab is in the form of a continuous aperture 18, extending longitudinally from a front pillar structure 20, having a rearwardly angled portion 21, to a vertical rear pillar structure 22. The continuous aperture 18 is further defined by a lower sill 26 and an upper roof rail 29. A left front door 27 and left rear compartment door 28, each hinged on the cab body, form a dual-door arrangement for closing the continuous aperture 18.

The front door 27 has an external handle 30 for actuating a conventional front door latch assembly, not shown, which is adapted to be locked, latched, and unlatched to a conventional keeper, shown in simplified form at 32 on a forward shut-face 34 of the rear door 28. The rear door, which in the disclosed embodiment is a half-door with no outside door handle, is swingably mounted on the rear pillar structure 22 by upper 35 and lower 36 spaced hinges.

As seen in FIG. 1, an upper 38 and lower 39 rear door latches are mounted on an inner panel 40 of the rear door 28 in alignment with associated upper 42 and lower 43 strikers, supported on the cab roof rail 24 and the body sill 26, respectively. The door latches 38, 39 used in the disclosed embodiment are rotatable caliper latches, which are mechanically biased into their latched position. Such caliper latches are well known in the automotive industry and are supplied, for example, by The Automotive Body Systems Division of Rockwell International Corporation.

Upon a manual override arrangement, to be described below, being operated, the latches 38 and 39 may be disengaged from their latched positions by manual actuation by either a shut face door opening handle 44, mounted on rear door forward shut-face 34, or an inside door opening actuator handle 45, mounted on rear door inner panel 40.

Each rear door opening handle 44 and 45 is operatively connected to the upper 38 and lower 39 rear door latches, by means of mechanical linkages, including upper 47 and lower 48 latch rods controlled through an interposed rear door latch remote control assembly, generally indicated in dashed lines by the numeral 50.

Figure 2:
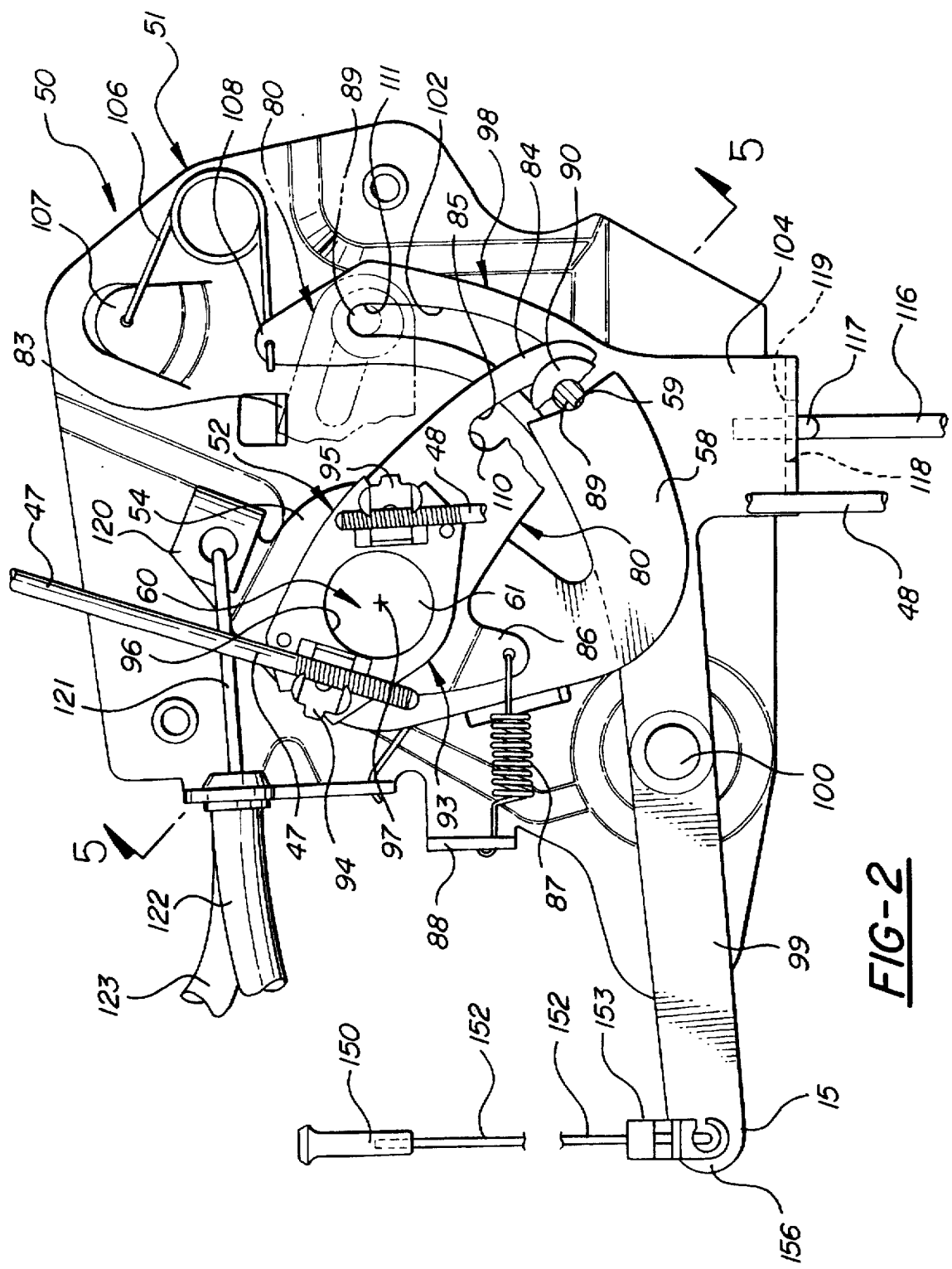
FIG. 2 is an enlarged side view of the control assembly, shown in its locked position.
Figure 4:
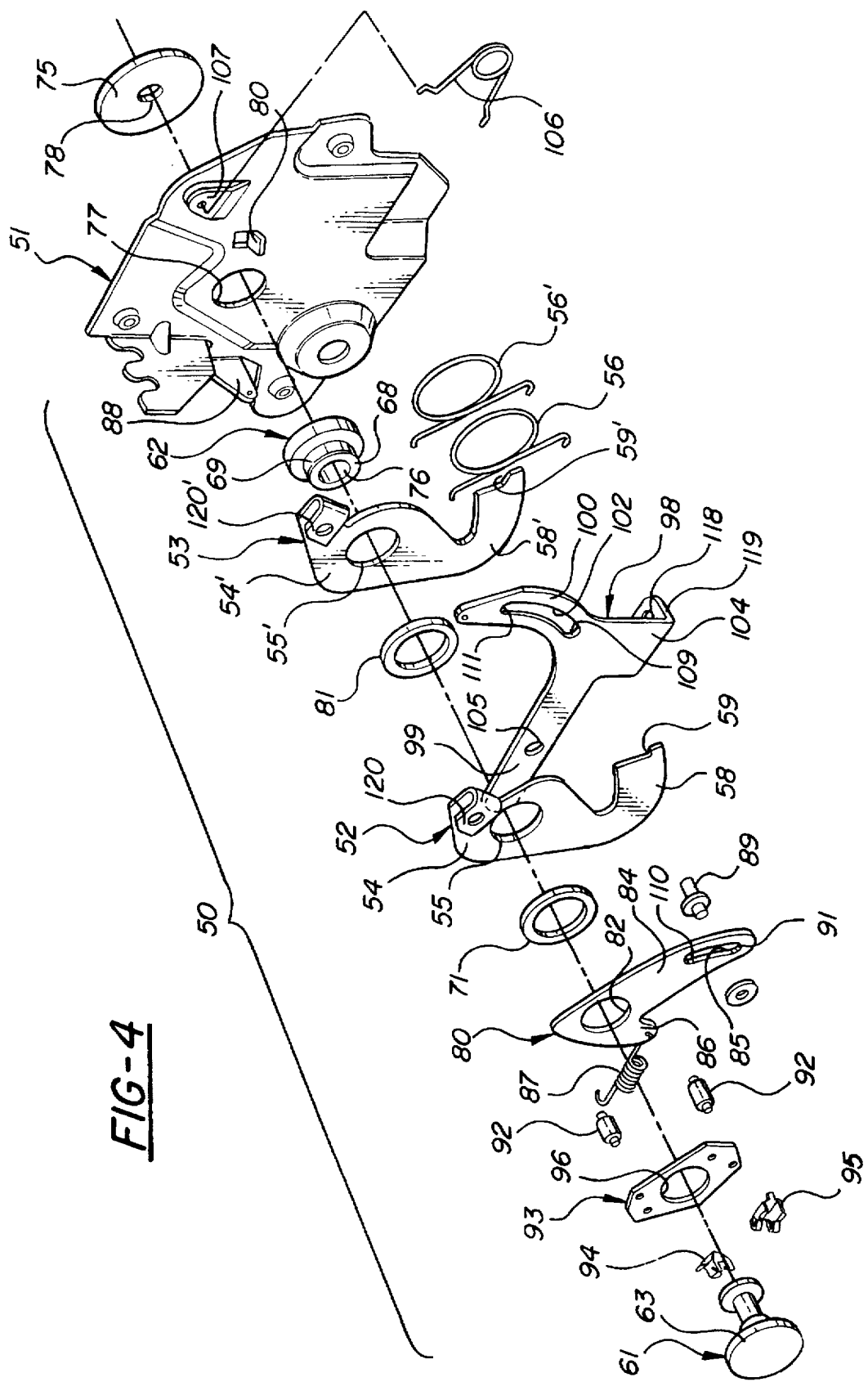
FIG. 4 is an exploded perspective of the dual-door control assembly.

Referring to FIG. 2, the remote control assembly 50 includes a back plate 51, adapted for mounting on inner panel 40 of the rear door 28, supporting a pair of first 52 and second 53 operating levers, best shown in FIG. 4. As the operating levers 52 and 53 are identical, the same reference numerals will be used in their description, except that the reference numerals for the second operating lever 53 will be primed. The first 52 and second 53 operating levers are adapted to be actuated by the shut face handle 44 and the inside handle 45, respectively, in a manner to be explained.

Figure 5:
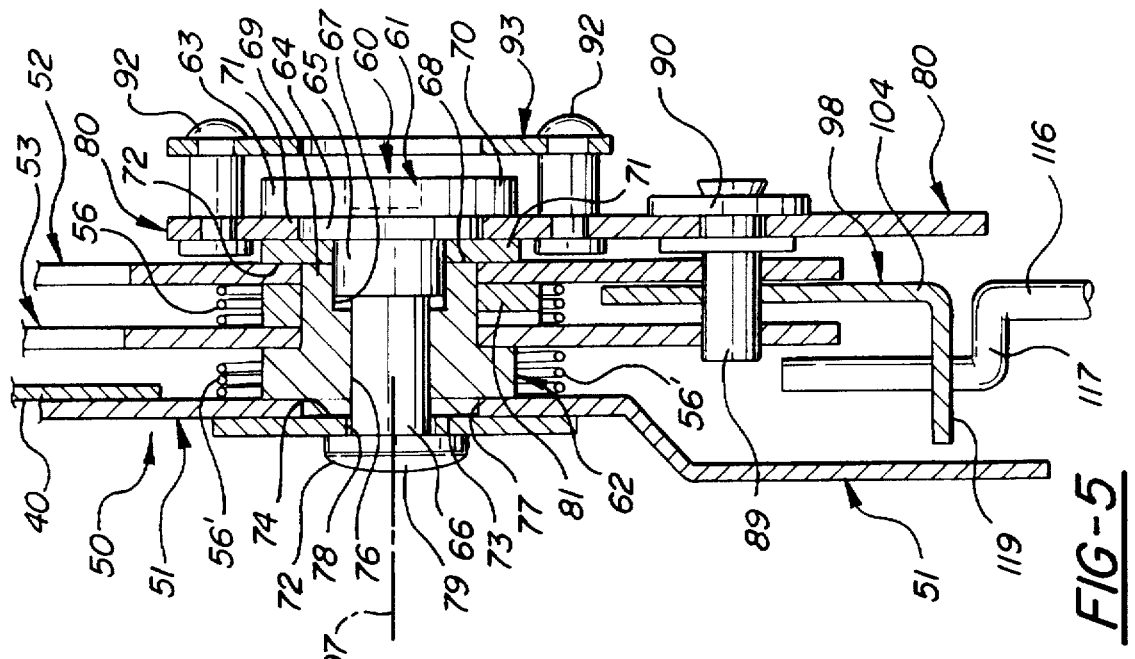
FIG. 5 is a cross sectional view taken substantially on the line 5—5 of FIG. 2.
Figure 6:
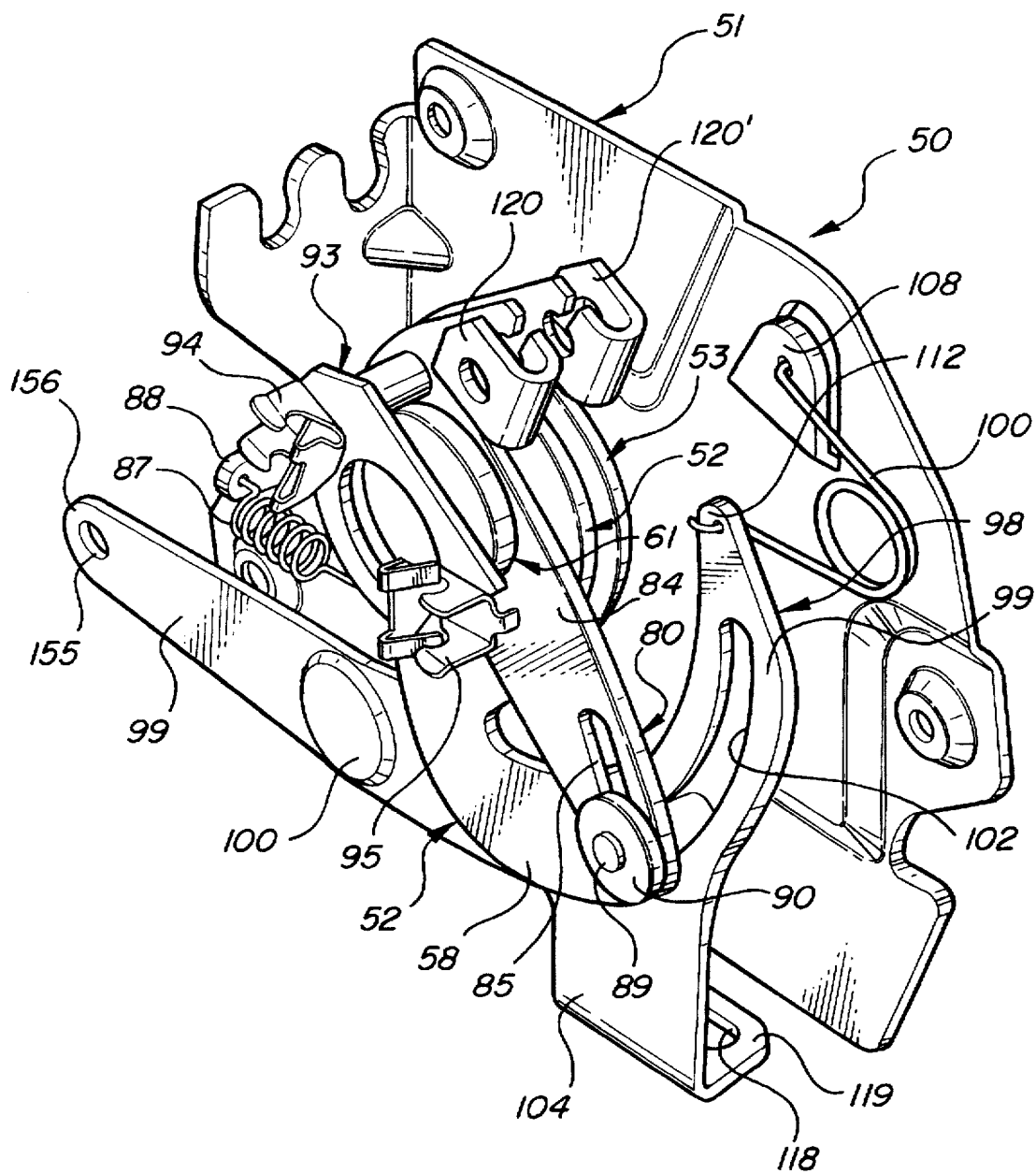
FIG. 6 is an enlarged perspective view of the latching mechanism.

As seen in FIGS. 5 and 6, the operating levers 52 and 53 are each pivotally mounted, at their associated central portions 54 and 54', by means of aligned holes 55, 55', to an axially extending split-pin, generally indicated by numeral 60 in FIG. 5. Each operating lever 52 and 53 is spring biased, in a clockwise rotational one direction, by an associated coil torsion spring 56, 56', encircling the split-pin 60, into a rest position contacting axially extending stop 57 (FIG. 3), lanced-out from the back plate 51. It will be noted in FIG. 4 that each operating lever central portions 54, 54' is formed with a curved finger 58, 58', with each finger terminating at its free end in a radiused link pin seat 59, 59'.

With reference to FIG. 5, the split-pin 60 includes a head member 61 and a cylindrical bushing member 62, with the head member 61 having a circular head 63 formed with an integral, concentric, first stepped shoulder 64 and a concentric second, stepped shoulder 65, terminating in an axial stem 66. The second shoulder 65 is shown snugly received in an axial counterbore 67, formed in inner end face 68 of bushing member axial collar 69. It will be noted that the first shoulder 64 is in flush abutment with an opposed face 70 of a washer-like, first dimensional stack-up spacer 71, while opposite face 72 of the first spacer 71 is in flush abutment with the bushing collar inner end face 68. As bushing outer end face 73 is in flush abutment with inner surface 74 of backing plate disc 75, lap welded to the plate 51, the head 61 and bushing 62 members are bottomed-out" against themselves in an axially adjustable manner. Thus, upon the shoulder 65 being snugly received in counter-bore 67, and the stem 66 being snugly received in bushing axial bore 76, aligned back plate hole 77, and disc hole 78, the stem free end is rivet staked at 79 to the disc 75, such that the split-pin 60 holds the operating levers 52, 53 and a latch release lever 80 in an axially fixed, rigid manner relative to the back plate 51.

Applicants' split-pin arrangement allows the head 61 and bushing 62 members to bottom-out against each other, while accommodating variable thickness dimensions of the first spacer 71 together with a second stack-up spacer 81. The bottom-out feature, together with the axial tolerance accommodating spacers, enables the split-pin to provide positive abutting assembly, with parallel, close tolerance rotation of the two operating levers 52, 53 and the release lever 80. Further, the operating levers enable each of their opposed faces to contact the stack-up tolerance accommodating second spacer 81. This allows the spacers 71 and 81 to be selected with the required dimensional thickness, while assuring that the head member 61 and the bushing member 62 bottoming-out against each other.

Referring to FIG. 2, the bellcrank release lever 80 is shown mounted on the split-pin 60, by means of its aligned hole 82, for swinging movement, in a counterclockwise one direction, from a spring biased rest position to a rear door latch releasing position, indicated partially by dashed lines. A transversely extending stop 83, lanced from the back plate 51, prevents overtravel of the release lever 80 in the one direction beyond its unlatching position. The bellcrank release lever 80 includes a first leg 84, formed with a first arcuate guide slot 85, and a second short leg 86, connected by a helical coil tension biasing spring 87, to a back plate side tab 88. A transversely extending link pin 89, having an outer retaining washer 90 thereon, is received in the first guide slot 85. It will be noted in FIG. 2 that the link pin 89 is shown yieldably held in contact with radiused distal end 91 of the first guide slot, in a manner to be explained.

A release lever clip plate 93, shown in FIG. 5 supported in axially spaced relation on the release lever 80 by two shoulder rivets 92, mounts a pair of rod clips 94 and 95, disposed in substantially diametrically opposed spaced relation, for rotation about the split-pin transverse principal axis 97. As seen in FIG. 2, the rod clip 94 supports the lower end of the upwardly extending upper latch rod 47, while the rod clip 95 supports the upper end of the downwardly extending lower latch rod 48.

A locking lever, shown at 98 in FIG. 2, includes a first linear portion 99 pivoted on the back plate by a transversely extending pivot pin 100 disposed in parallel remote relation to the split-pin 60. The locking lever terminates in a second arcuate portion 101, provided with a second arcuate guide slot 102. The locking lever 98 further includes an actuating tongue portion 104, which extends downwardly from an intermediate section of the locking lever adjacent the juncture of its linear 99 and arcuate 101 portions. It will be noted in FIG. 4 that pivot pin hole 105 is located adjacent the midpoint of the locking lever linear portion 99. A torsion coil spring 106, connected between a back plate tab portion 107 and free end 108 of the locking lever arcuate portion 99, snaps the locking lever overcenter about pivot pin 100 for yieldable retention between its latch releasing mode of FIG. 2 and its latch locking mode of FIG. 3.

Figure 3:
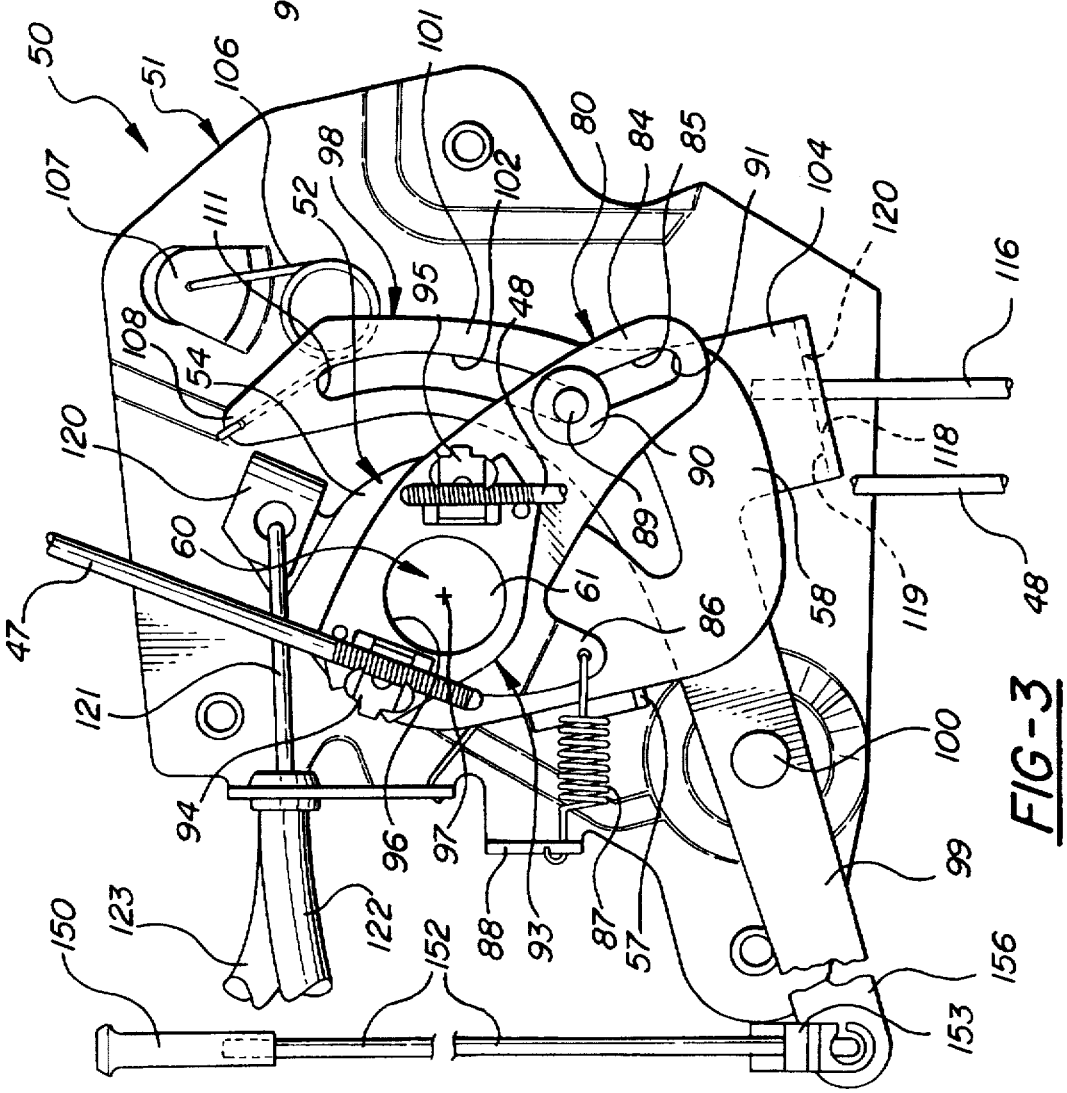
FIG. 3 is a view similar to FIG. 2, showing the dual-door control assembly in its unlocked position.

It will be noted in the locking lever overcenter release mode of FIG. 2 that the link pin 89 contacts the locking lever second guide slot radiused proximate end, best shown at 109 in FIG. 4. As a result, the locking lever yieldably holds link pin 89 at the distal end 91 of the release lever first arcuate guide slot 85. Referring to FIG. 3, it will be seen that with the locking lever snapped to its overcenter latch locking mode, the locking lever second slot 102 yieldably holds the link pin 89 in contact with the release lever first guide slot radiused proximate end, best seen at 110 in FIG. 4. Upon the release lever 80 being pivoted about split-pin 60 to its latch released dashed-line position of FIG. 2, the link pin 89 contacts radiused distal end 111 of the locking lever second guide slot 102. It will be observed that with the locking lever in either its latch releasing mode of FIG. 2, or its latch locking mode of FIG. 3, its arcuate guide slot 102 lies on a circular arc centered on the axis of rotation 97 of the split-pin 60.

Referring to FIGS. 2 and 3, the locking lever 98 is adapted to be automatically snapped overcenter, between its latch releasing and latch locking modes, by means of its tongue portion 104 being connected to an upstanding control rod 116. FIG. 5 shows the control rod 116 having an upper end formed with a right-angle bend 117, providing a slidable connection with the tongue portion 104. The right-angle bend 117 is movably received in an elongated slot 118 in actuator tongue lower wall portion 119, disposed normal to the tongue portion 104.

As seen in FIG. 6, each operating lever 52 and 53 has one end formed with an associated U-shaped cable connector 120 and 120', located substantially diametrically opposite its associated curved finger portion 58, 58'. FIGS. 2 and 3 show operating lever connector 120 being connected to one cable core end 121, of a flexible cable sheath 122, while connector 120' is connected to one cable core end, not shown, of cable sheath 123. Referring to FIG. 1, cable sheath 122 has its cable core opposite end, not shown, connected to rear door shut face handle 44, while cable sheath 123 has its cable core opposite end, not shown, connected to inside handle 45 of the rear door.

Figure 8:
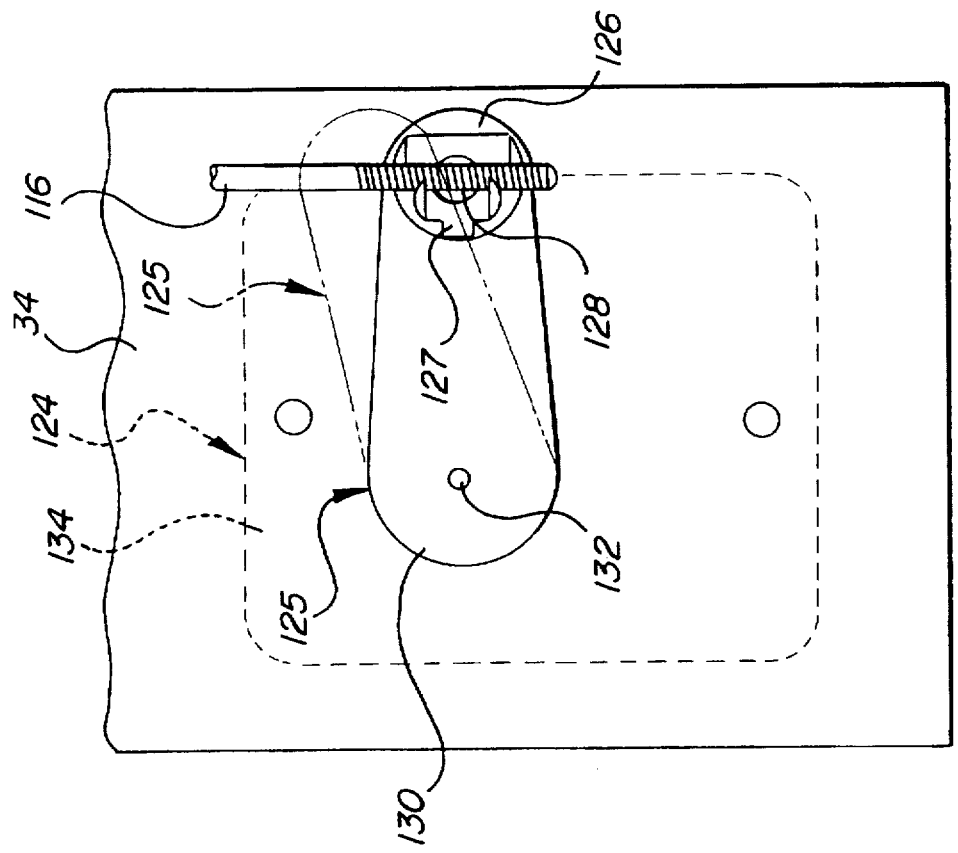
FIG. 8 is an enlarged, fragmentary, elevational view of the FIG. 7 shut face interior, showing the latch interlock mechanism pivot arm.
Figure 7:
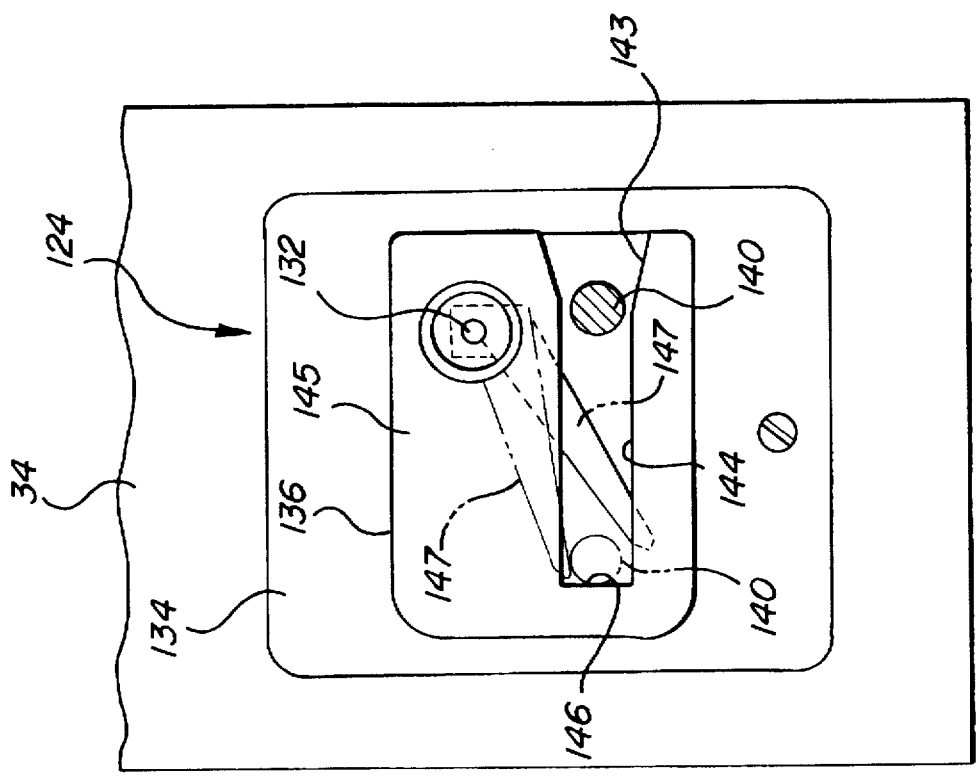
FIG. 7 is an enlarged, fragmentary, elevational view of the rear door forward shut face exterior showing the latch interlock mechanism.

With reference to FIG. 8, numeral 124 generally indicates a latch interlock mechanism 124, mounted on the rear door shut face 34. The interlock mechanism includes a pivot arm 125, with its free end 126 connected to a lower end of the control rod 116 by means of rod clip 127, pivoted to the arm by a rivet pin 128. An opposite end 130 of the pivot arm 125 is connected, by a rivet pin 132, to a vertically disposed mounting base 134 supporting an interlock case, generally indicated at 136 in FIG. 7. In FIG. 7 a tripping pintle 140 is shown extending normally from rear shut face 142 of the front door 27. Referring to FIG. 7, it will be observed that as the front door is being closed, the pintle 140 is adapted to be initially received in lead-in throat 143 of a horizontal passage 144, provided in interlock case side wall 145. With the front door shut, the pintle 140 is located in its dashed-line position, adjacent blind end 146 of the passage 144, after the pintle has rotated a trigger 147 upwardly about rivet pin 132, from the trigger spring biased solid line position, to its dashed-line position. As the trigger 147 and the pivot arm 125 rotate conjointly on the rivet pin 132, closing the front door results in the interlock arm 125 being pivoted to upwardly, causing the control rod to snap the locking lever 98 overcenter to its latch locking mode, thereby disabling the rear door actuator handles 44, 45.

The latch control assembly includes a manual overriding actuator to snap the locking lever 98 from its latch locking mode of FIG. 3 to its latch releasing mode of FIG. 2. Referring to FIG. 1, the manual actuator is in the form of a vertically movable garnish button 150 for controlling the locking lever 98, suitably mounted on the inside panel 40 of the rear door. The button 150 is shown in FIG. 3 linked to the first linear portion 99 of the locking lever by a vertically disposed rod member 152. The linear portion is pivotally attached to the rod member lower end by a conventional plastic "carburetor" clip 153, having a normally extending tubular portion 154 snapped into circular aperture 155, adjacent free end 156 of the locking lever linear portion 99. When it is desired to open the rear door 28, after opening the front door, it is necessary that a person first pull-up the override actuator button 150, snapping the locking lever 98 overcenter to its latch releasing mode of FIG. 2. Secondly, it is necessary to actuate one of the rear door handles 44 or 45, which swings its associated operating lever and release lever, by means of its cable sheath linkage, thereby shifting the latch rods 47 and 48 so as to simultaneously unlatch the rear door upper 40 and lower 41 latches. It will be noted that the actuator button 150 will be automatically returned to its raised, rear door handle overriding FIG. 2 position, by means of interlock mechanism 124, upon the rear door 28 being closed, and thereafter the front door 27 being closed.

Although the invention has been described by reference to a specific embodiment, it should be understood that numerous changes may be made within the spirit and scope of the inventive concepts described. Accordingly, it is intended that the invention not be limited to the described embodiment,

7 but that it have the full scope defined by the language of the following claims.

What is claimed is:

1. A latch remote control assembly for mounting on a vehicle door adapted to control first and second door latches, said assembly comprising:

a back plate, a pair of operating levers pivoted on a back plate split-pin, each having a radiused seat on one end and a connector on an opposite end, for movement in one direction between a spring biased rest position and a latch releasing position, by associated first and second handle means on the door, with each said handle means for being linked to an associated one of said operating lever connectors;

a release lever, pivoted on said split-pin, having a leg formed with a first arcuate guide slot receiving a link pin, said release lever connectable by linking means to each said door latch, such that pivoting said release lever in said one direction between a biased rest position and a latch unlatching position unlatches said door latches;

a locking lever having a first portion pivoted on said back plate and a second portion located intermediate said operating levers, spring means for being connected between said back plate and said second portion, for overcenter snap movement of said locking lever between a latch releasing mode and a latch locking mode, and said link pin received in a second arcuate guide slot in said second portion; wherein with said locking lever in its latch releasing mode, said link pin is at a proximate end of said second slot and said link pin is yieldably held at a distal end of said first slot, while said release lever biases said link pin into each said operating lever radiused seat, whereby actuation of either handle means swings its associated operating lever and said release lever in said one direction, unlatching the door latches; and with said locking lever snapped overcenter to its latch locking mode said link pin is yieldably held at a proximate end of said first slot, such that actuation of either handle means causes its associated operating lever to freewheel, obviating unlatching of the door latches.

2. The door latch remote control assembly as set forth in claim 1 wherein said each said operating lever one end is formed with a curved finger portion terminating in said radiused seat.

3. The door latch remote control assembly as set forth in claim 1 wherein said release lever in the form of a bellcrank release lever with said leg defining a first leg, and a second leg being connected by spring means to said back plate, biasing said release lever in a clockwise opposite direction to its rest position.

4. The door latch remote control assembly as set forth in claim 1 wherein said split-pin has a principal axis disposed transverse to said back plate, and said release lever linking means is in the form of a release plate supported in axially spaced relation on said release lever, said release plate having first and second clips rotatably connected thereto, disposed in substantially diametrically opposed spaced relation for rotation about said split-pin principal axis.

5. The door latch remote control assembly as set forth in claim 4 wherein an upper latch rod has its lower end connected to said release lever first clip and its upper end for being connected to the door first latch, and wherein a lower latch rod has its upper end connected to said release lever

8 second clip and its lower for being connected to the door second latch, wherein upon said release lever being pivoted in said one direction, causing said upper latch rod to shift upwardly to unlatch the first latch, and said lower latch rod to shift downwardly to unlatch the second latch.

6. The door latch remote control assembly as set forth in claim 1 wherein each said door handle means is for being operatively linked, by a flexible cable means, to an associated one of said operating lever connectors.

7. The door latch remote control assembly as set forth in claim 1 wherein said split-pin comprises a head member and a bushing member, said head member formed with a stem adapted for sliding reception in an axial bore of said bushing member.

8. The door latch remote control assembly as set forth in claim 7 wherein said stem of said head member is formed with a plurality of stepped cylindrical shoulders, and said bushing member is cylindrical-shaped, and is formed with said axial through bore terminating at an inner end in a countersunk bore, such that said stem is slidably received in said axial bore and one of said stepped shoulders is slidably received in said countersunk bore, whereby said split-pin allows telescopic axial dimensional adjustment to accommodate a first stack-up spacer of selected thickness intermediate said operating levers and a second stack-up spacer intermediate said release lever and an opposed one of said operating levers, whereby said operating levers and said release lever are rigidly supported on said back plate in a close tolerance manner, thereby insuring parallel paths of rotation of said pair of operating levers and said release lever.

9. The door latch remote control assembly as set forth in claim 8 wherein said stem of said head member has a free end that is rivet staked to a disk welded to said back plate.

10. The door latch remote control assembly as set forth in claim 9 wherein said locking lever first portion is in the form of a linear portion having a pivot pin adjacent its midpoint, said pivot pin, for being disposed with a principal axis of rotation extending transverse to said back plate for pivotally connecting said locking lever to said back plate, and said split-pin is disposed with its principal axis of rotation parallel to and remote from said pivot pin principal axis.

11. The door latch remote control assembly as set forth in claim 10 wherein said first arcuate guide slot is concentrically disposed about said pivot pin axis of rotation, with said release lever in its rest position.

12. The door latch remote control assembly as set forth in claim 11 wherein said second arcuate slot is concentrically disposed about an axis of rotation of said split-pin with said locking lever in either its latch releasing mode or its latch locking mode.

13. The door latch remote control assembly as set forth in claim 1 wherein each said operating lever is spring biased by a torque spring having respective coiled portions encircling said split-pin, terminating in a first free end connected to said back plate and a second free end connected to its associated operating lever.

14. The door latch remote control assembly as set forth in claim 10 wherein principal axis of said link pin is disposed parallel to the principal axes of said split-pin and said pivot pin.

15. The door latch remote control assembly as set forth in claim 1 wherein said locking lever spring means is in the form of a coil spring terminating in a first leg being hooked to said back plate and a second leg being hooked adjacent a free end of said locking lever second portion.

16. The door latch remote control assembly as set forth in claim 10 wherein said locking lever second portion is in the form of an arcuate portion provided with said second arcuate guide slot, said locking lever being formed with a downwardly extending actuating tongue portion, located adjacent the juncture of said linear portion and said arcuate portion.

17. The door latch remote control assembly as set forth in claim 16 wherein the door is a rear door of a front and rear dual-door arrangement for a vehicle body continuous, longitudinally extending, aperture formed through the side of the body, and wherein said back plate is adapted to be secured to a rear door panel, and said locking lever tongue portion is connected by a control rod to interlock means to be mounted on the rear door, wherein, upon the front door being closed, said interlock means is to be tripped by protruding means on the front door, causing said control rod to be shifted upwardly, thereby snapping said locking lever overcenter from its latch releasing mode to its latch locking mode, obviating the rear door latches from being unlatched from their associated striker means mounted on the vehicle body by either of said rear door handle means.

18. The door latch remote control assembly as set forth in claim 17 wherein upon the front door being opened, said locking lever remains in the rear door latch locking mode thereby disabling both rear door opening handle means, and wherein manual override actuator means, positionable on the inside of the rear door, is connected by override linkage means to said locking lever linear portion adjacent a free end thereof, whereby upon said manual override actuator means being pulled-up as said locking lever is snapped overcenter from its latch locking mode to its latch releasing mode, enabling either of the rear door handle means, upon being actuated, to unlatch the rear door first and second latches.

19. The door latch remote control assembly as set forth in claim 16 wherein said locking lever tongue portion is formed with aperture means receiving one upper end of an upstanding control rod, said control rod having an opposite lower end connected to an interlock means for being mounted on a forward shut face of the rear door such that, upon the front door being closed, a pintle projecting longitudinally from an aft shut face of the front door is receivable in a passageway of said interlock means for rotating a downwardly biased pivot arm upwardly, resulting in upward shifting of said control rod, thereby snapping said locking lever overcenter from its latch releasing mode to its latch locking mode, obviating the rear door latches from being unlatched from their associated striker means mounted on the vehicle body.

* * * * *